United States Patent [19]

Fiss

[11] 4,016,725
[45] Apr. 12, 1977

[54] APPARATUS FOR RECAPTURING LOST ENERGY IN A THERMOELECTRIC GENERATING PLANT

[76] Inventor: Edward C. Fiss, 5436 Topping Place, Charlotte, N.C. 28209

[22] Filed: June 20, 1975

[21] Appl. No.: 588,730

[52] U.S. Cl. .................................. 60/690; 60/655; 165/DIG. 1; 261/DIG. 11
[51] Int. Cl.² ..................... F02C 1/04; F01K 23/04
[58] Field of Search ........... 60/690, 691, 692, 693, 60/698, 655; 165/DIG. 1; 261/DIG. 11

[56] References Cited

UNITED STATES PATENTS

| 401,516 | 4/1889 | Robb | 60/641 |
|---|---|---|---|
| 3,048,006 | 8/1962 | Goodman | 60/641 |
| 3,436,908 | 4/1969 | Delic | 60/641 |
| 3,731,461 | 5/1973 | Hamon | 261/DIG. 11 |

*Primary Examiner*—Allen M. Ostrager
*Attorney, Agent, or Firm*—Bell, Seltzer, Park & Gibson

[57] ABSTRACT

In a thermoelectric generating plant utilizing heat to generate electric energy and having a recirculating water system in which the water is heated during passage through the plant and must be cooled before recirculation to the plant thus causing a heat loss and resultant loss of energy; the combination therein of apparatus for recapturing a portion of the normally lost energy. The apparatus includes a natural air draft, cooling tower for the flow of air from the bottom to the top thereof and disposed in the recirculating water system for receiving the heated water and passing the heated water through the flow of air at generally the bottom thereof for cooling the heated water and heating the air to cause a natural draft flow of air up through the tower. A rotor is positioned within the cooling tower for being rotated by the natural draft flow of air therethrough and an electric generator is driven by the rotor to generate electric energy and thus recapture a portion of the normally lost energy from the plant.

5 Claims, 4 Drawing Figures

U.S. Patent
April 12, 1977
4,016,725
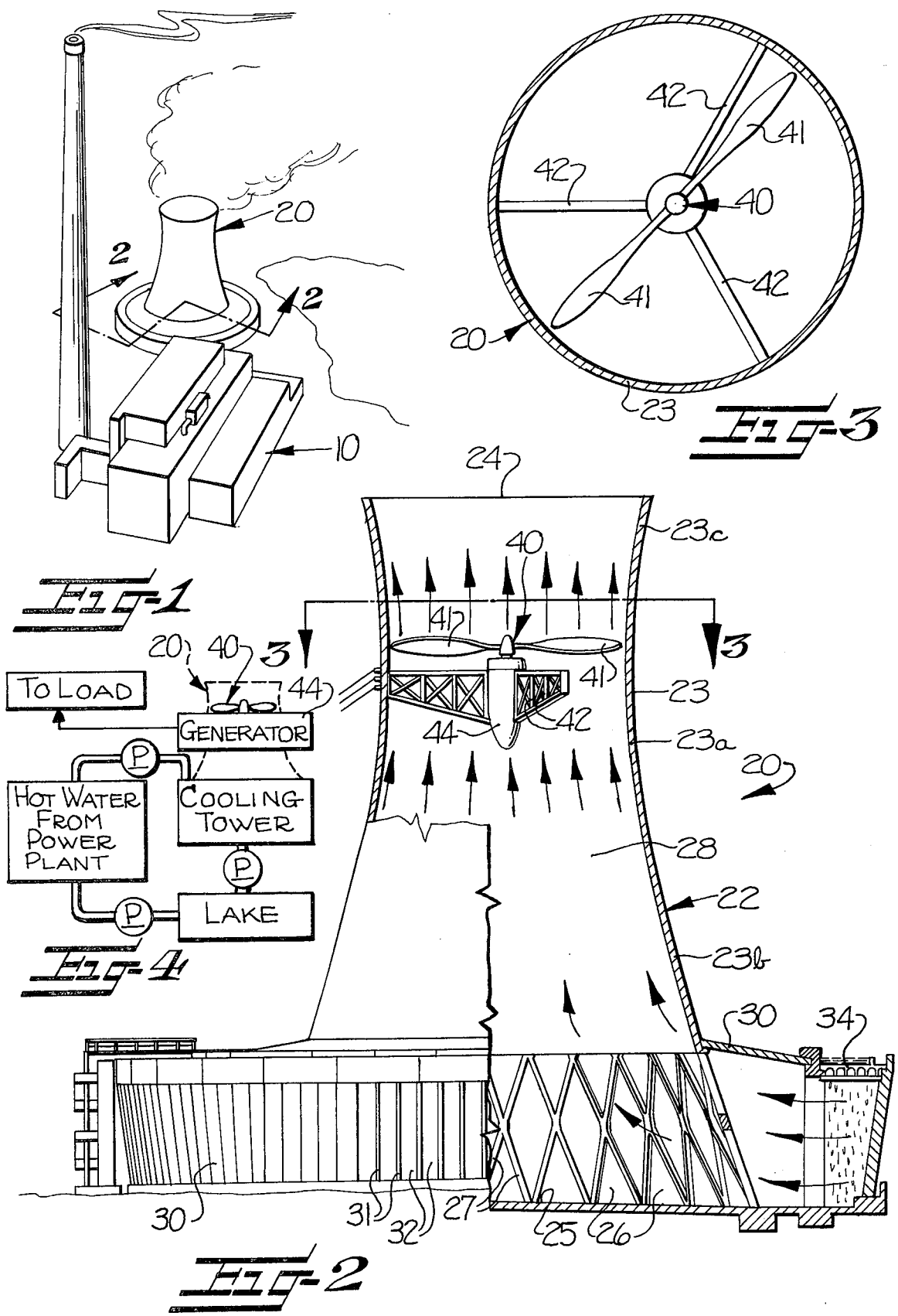

APPARATUS FOR RECAPTURING LOST ENERGY IN A THERMOELECTRIC GENERATING PLANT

This invention is directed to means for recapturing a portion of the normally lost energy in a thermoelectric generating plant utilizing heat to generate electric energy and having a recirculating water system in which the water is heated during passage through the plant and must be cooled before recirculation to the plant thus causing a heat loss and resultant loss of energy.

BACKGROUND OF THE INVENTION

In thermoelectric generating plants such as steam or nuclear electric generating plants, a recirculating water system through the plant is required in which the water is heated during passage through the plant by the electric generating operation, as is well understood by those with ordinary skill in the art. This heated water was previously dumped into lakes or rivers for cooling and water from the lakes or rivers was circulated back into the plant. Thus, the heat generated in the water was lost with a resultant loss of energy.

More recently, Federal and State regulations have prohibited the dumping of heated water from a thermoelectric generating plant directly into neighboring rivers or lakes and electric generating plants have begun to use cooling towers of either the forced draft type in which a fan or other mechanism causes the flow of air through the cooling tower and consumes additional energy or the natural draft type in which a natural draft of air is created through the cooling tower for cooling of the hot water before recirculation to the plant. While these systems accomplished cooling of the water and eliminated the dumping of hot water into neighboring streams or lakes, these systems also caused heat loss and resultant loss of energy in the electric generating plant operation.

No means or apparatus has heretofore been proposed for recapturing any portion of this normally lost energy in an electric generating plant operation.

OBJECT AND SUMMARY OF THE INVENTION

Accordingly, it is the object of this invention to provide a means for recapturing a portion of the normally lost energy in a thermoelectric generating plant utilizing a natural air draft cooling tower.

By this invention, it has been found that the above object may be accomplished by providing in a thermoelectric generating plant utilizing heat to generate electric energy and having a recirculating water system in which the water is heated during passage through the plant and must be cooled before recirculation to the plant thus causing a heat loss and resultant loss of energy, the combination therein of means for recapturing a portion of the normally lost energy, as follows.

A natural air draft, cooling tower defines a generally vertically extending passageway for the flow of air therethrough from the bottom thereof to the top thereof and is disposed in the recirculating water system for receiving the heated water and passing the heated water through the flow of air at generally the bottom of the passageway for cooling the heated water and heating the air to cause a natural draft flow of air up through the passageway. A rotor means is positioned in the passageway of the cooling tower for being rotated by the natural draft flow of air therethrough, and electric generating means are connected with the rotor means for being driven thereby to generate electric energy by the rotation of the rotor means and thus recapture a portion of the normally lost energy from the plant.

It is preferable, that the cooling tower be generally venturi shaped defining a constricted medial portion and outer flaring portions and to have the rotor means positioned within the constricted portion for being rotated by the maximum velocity of the flow of air through the cooling tower.

Accordingly, it has been recognized for the first time by the invention hereof that an air rotor driven, electric generating apparatus may be placed within a natural air draft cooling tower of a thermoelectric generating plant for recapturing some of the energy normally lost in cooling of the water in such a plant operation. Although natural draft cooling towers have been previously utilized with electric generating plants and although air rotor driven, electric generating units have been previously proposed in wind tunnels or other air flow devices, there has never been a recognition of the above defined combination for use in recapturing some of the normally lost energy from a thermoelectric generating plant.

BRIEF DESCRIPTION OF THE DRAWINGS

Some of the objects and advantages of this invention having been stated, other objects and advantages will appear as the description proceeds, when taken in conjunction with the accompanying drawings, in which:

FIG. 1 is a perspective, schematic view of a thermoelectric generating plant utilizing the means for recapturing a portion of the normally lost energy of this invention;

FIG. 2 is a partial sectional view taken generally along the line 2—2 of FIG. 1;

FIG. 3 is a cross-sectional view, taken generally along the line 3—3 of FIG. 2; and FIG. 4 is a schematic diagram showing generally the flow of water through the recirculating water system of the electric generating plant.

DESCRIPTION OF PREFERRED EMBODIMENT

Referring now to the drawings, there is schematically shown in FIG. 1 a thermoelectric generating plant 10 which utilizes heat to generate electric energy and has a recirculating water system, shown schematically in FIG. 4, in which the water is heated during passage through the plant and must be cooled before recirculation to the plant thus causing a heat loss and resultant loss of energy. The thermoelectric generating plant 10 may be of the fossil or nuclear fuel type which has a recirculating water system. These thermoelectric generating plants 10 are well known to those with ordinary skill in the art and a detailed description thereof is not necessary herein for a full understanding of the present invention.

The present invention combines with the above-described electric generating plant 10, means, generally indicated at 20, for recapturing a portion of the normally lost energy in the plant 10. This means 20 comprises a natural air draft, cooling tower 22 which preferably comprises an elongate, vertically extending, hollow, venturi shaped, main portion 23 of generally circular cross-sectional shape having a generally medial, constricted portion 23a and outer flaring portions 23b and 23c and a top open end 24 and a bottom end 25 having openings 26 formed by struts 27 around the circumference thereof for defining a passageway 28 therethrough for the flow of air from the bottom thereof vertically upwardly and out the top thereof.

The cooling tower 22 may be of the cross-flow type illustrated herein and further including a hollow portion 30 extending generally horizontally and radially outwardly from the main portion 23 and circumferentially around the openings 26 in the bottom end 25 of the main portion 23 to define an air passageway therethrough. The radially extending portion 30 has openings 31 in an outer surface thereof formed by louvers 32 for the introduction of air therethrough and into the hollow interior thereof for flow into the passageway 28 of the main portion 23 and up through the passageway 28 and out of the open top end 24 thereof.

The radially extending portion 30 includes means 34 in the form of a trough on the upper surface thereof for receiving pumped heated water from the electric generating plant 10, as shown in FIG. 4, and passing the heated water, by apertures therein, generally vertically into and through the hollow interior of the radially extending portion 30 for contact with air passing therethrough, as indicated in FIG. 2, for cooling of the water and heating of the air to cause a natural draft flow of air up through the passageway 28 in the main portion 23 of the cooling tower 22.

Also, the cooling tower may be of the counterflow type in which the water to be cooled is introduced directly into the passageway 28.

As shown in FIG. 4, the cooled water from the cooling tower 22 may be pumped therefrom into a holding or supply lake and then pumped back into the electric generating plant 10, or the cooled water may be pumped directly back into the electric generating plant 10 and bypass any supply or holding lake.

The means 20, of this invention, for recapturing a portion of the normally lost energy further includes a rotor device 40 which may be in the form of two or more oppositely extending, opposing, generally curved blades 41 rotatably mounted by struts 42 within the passageway 28 of the main portion 23 of the cooling tower 22 and preferably within or adjacent to the constricted portion 23a of the venturi shaped main portion 23 for rotation by the flow of air, at its maximum velocity, as the air passes through the passageway 28 by the natural draft set up by the column of heated air during the cooling of the water. The rotor mechanism 40 is connected with an electric generator 44 for being driven by rotation of the rotor 40 to generate electric energy and thus recapture a portion of the normally lost energy from the electric generating plant 10.

By way of example, it has been determined that in an electric generating plant having a power rating in the order of 1200MW and utilizing a cooling tower 22 having a height of approximately 131 meters and a diameter of approximately 61 meters at the constricted portion 23a and a diameter of approximately 66 meters at the open top end thereof, the mass of dry air leaving the tower will be approximately 1,000,000 Kg per minute, and the velocity at the constricted area of the passageway 27 will be approximately 5.85 meters per second. Saturation of the air by the evaporation of water in the cooling process adds 87,605 Kg/min water vapor to the air stream. Accordingly, Kinetic Energy $= \frac{1}{2}(w/g_o)v^2$ $$KE = \left(\frac{1}{2}\right)\left(\frac{1087605}{9.807 \times 60}\right)(5.85^2)$$

KE = 31628 Kgm/sec $g_o$ equals the gravitational constant of 9.807. Since the aerodynamic limit equals 16/27 or 0.592 and since one kilowatt equals 101.97 Kgm/sec, recoverable Kinetic Energy may be determined by:

KE = (31628) (0.592/101.97) = 184 KW

At 75 percent efficiency, the energy recoverable by the means 20 of this invention is:

Recoverable Energy = (0.75) (184)

Recoverable Energy = 138 KW

Accordingly, with the means 20 of this invention for recapturing a portion of the normally lost energy, 138 KW of energy may be recaptured for adding to the total megawatt rating of the plant 10. The above example and the FIGURES used therein are without optimization and it may be found that additional benefits are obtained by use of the apparatus of this invention.

In the drawings and specification, there has been set forth a preferred embodiment of this invention, and although specific terms are employed, they are used in a generic and descriptive sense only and not for purposes of limitation.

What is claimed is:

1. In a thermoelectric generating plant utilizing heat to generate electric energy and having a recirculating water system in which the water is heated during passage through the plant and must be cooled before recirculation to the plant thus causing a heat loss and resultant loss of energy; the combination therein of means for recapturing a portion of the normally lost energy comprising:

a natural air draft, cooling tower defining a generally vertically extending passageway for the flow of air therethrough from the bottom thereof to the top thereof and being disposed in said recirculating water system for receiving the heated water and passing the heated water through the flow of air at generally the bottom of said passageway for cooling the heated water and heating the air to cause a natural draft flow of air up through said passageway;

rotor means positioned in said passageway of said cooling tower for being rotated by the natural draft flow of air therethrough; and electric generating means connected with said rotor means for being driven thereby to generate electric energy by the rotation of said rotor means and thus recapture a portion of the normally lost energy from said plant.

2. In a thermoelectric generating plant, as set forth in claim 1, in which said air passageway through said cooling tower is generally venturi shaped defining a generally medial, constricted portion and outer flaring portions, and in which said rotor means is positioned within the constricted portion for being rotated by the maximum velocity of the flow of air through said passageway of said cooling tower.

3. In a thermoelectric generating plant, as set forth in claim 1, in which said cooling tower further includes a generally horizontally and radially extending portion around the bottom thereof and being generally hollow to define a generally horizontally and radially extending passageway from the outside to the inside thereof which communicates with the generally vertically extending passageway in said cooling tower for establishing an air flow therethrough, and in which said radially extending portion includes means for receiving the heated water from said plant on the top thereof and passing the heated water generally vertically into and through the passageway therethrough for contact with the flow of air therethrough for cooling of the water and heating of the air.

4. In a thermoelectric generating plant, as set forth in claim 1, in which said rotor means comprises at least two oppositely extending, opposing, generally curved blades for being rotated by the flow of air through said cooling tower.

5. In a thermoelectric generating plant utilizing heat to generate electric energy and having a recirculating water system in which the water is heated during passage through the plant and must be cooled before recirculation to the plant thus causing a heat loss and resultant loss of energy; the combination therein of means for recapturing a portion of the normally lost energy comprising:

a natural air draft, cooling tower comprising an elongate, vertically extending, hollow, venturi shaped, main portion of generally circular cross-sectional shape defining a generally medial constricted portion and outer flaring portions and having a top open end and a bottom end having openings around the circumference thereof for defining a passageway therethrough for the flow of air therethrough from the bottom thereof vertically upwardly and out of the top thereof, and a hollow portion extending generally horizontally and radially outwardly from said main portion circumferentially around said openings in said bottom end of said main portion and having openings in an outer surface thereof for the introduction of air therethrough and into the hollow interior thereof for flow into said main portion and up through said passageway in said main portion and out of the top thereof, said radially extending portion including means for receiving the heated water from said plant on the top thereof and passing the heated water generally vertically into and through the hollow interior thereof for contact with the air passing therethrough for cooling of the water and heating of the air to cause a natural draft flow of air up through said passageway in said main portion of said cooling tower;

rotor means positioned in said constricted portion of said passageway of said venturi shaped main portion of said cooling tower for being rotated by the natural draft flow of air therethrough; and electric generating means connected with said rotor for being driven thereby to generate electric energy by rotation of said rotor means and thus recapture a portion of the normally lost energy from said plant.

\* \* \* \* \*